Oct. 17, 1961     A. V. POND     3,004,608
INDEPENDENT FEATHERING SYSTEM
Filed Sept. 16, 1957     3 Sheets-Sheet 1

INVENTOR
ANTHONY V. POND
BY Vernon F. Hauschild
ATTORNEY

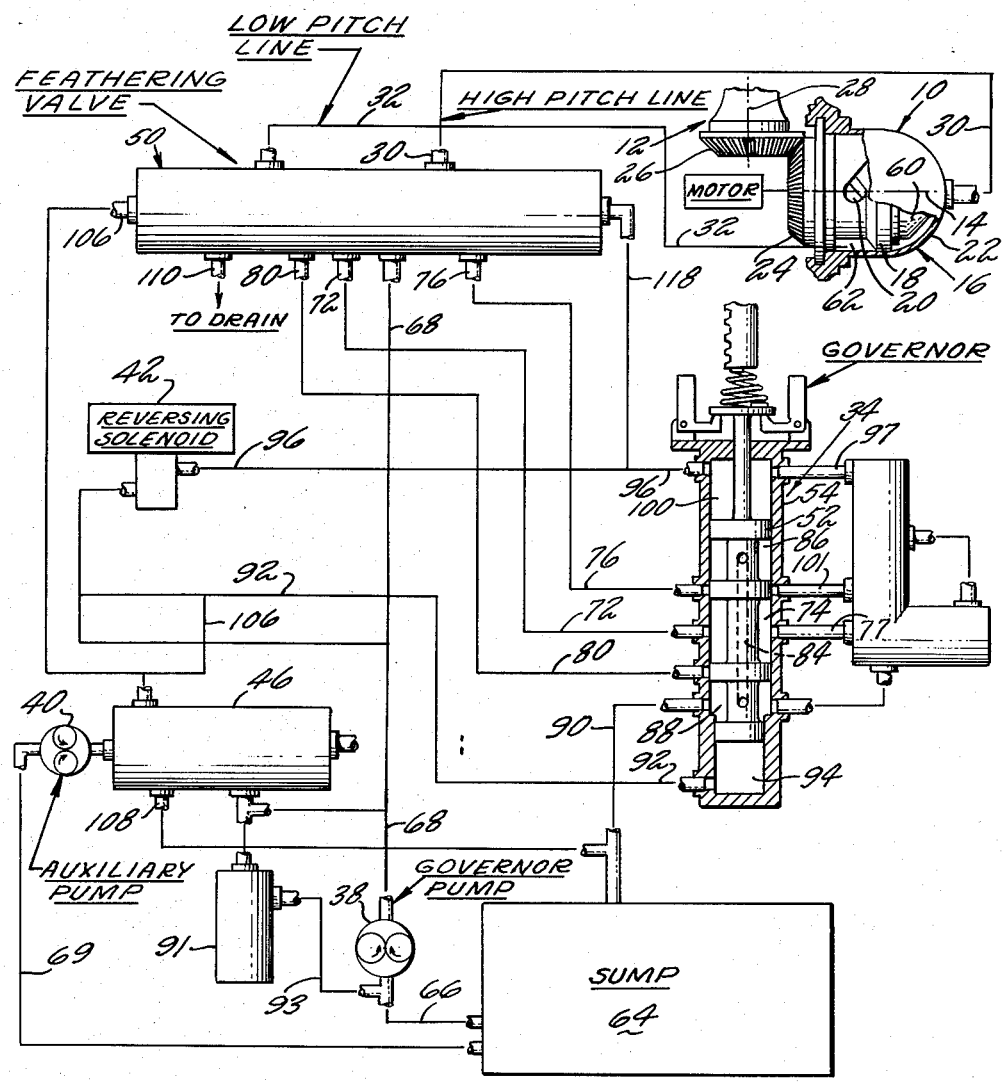

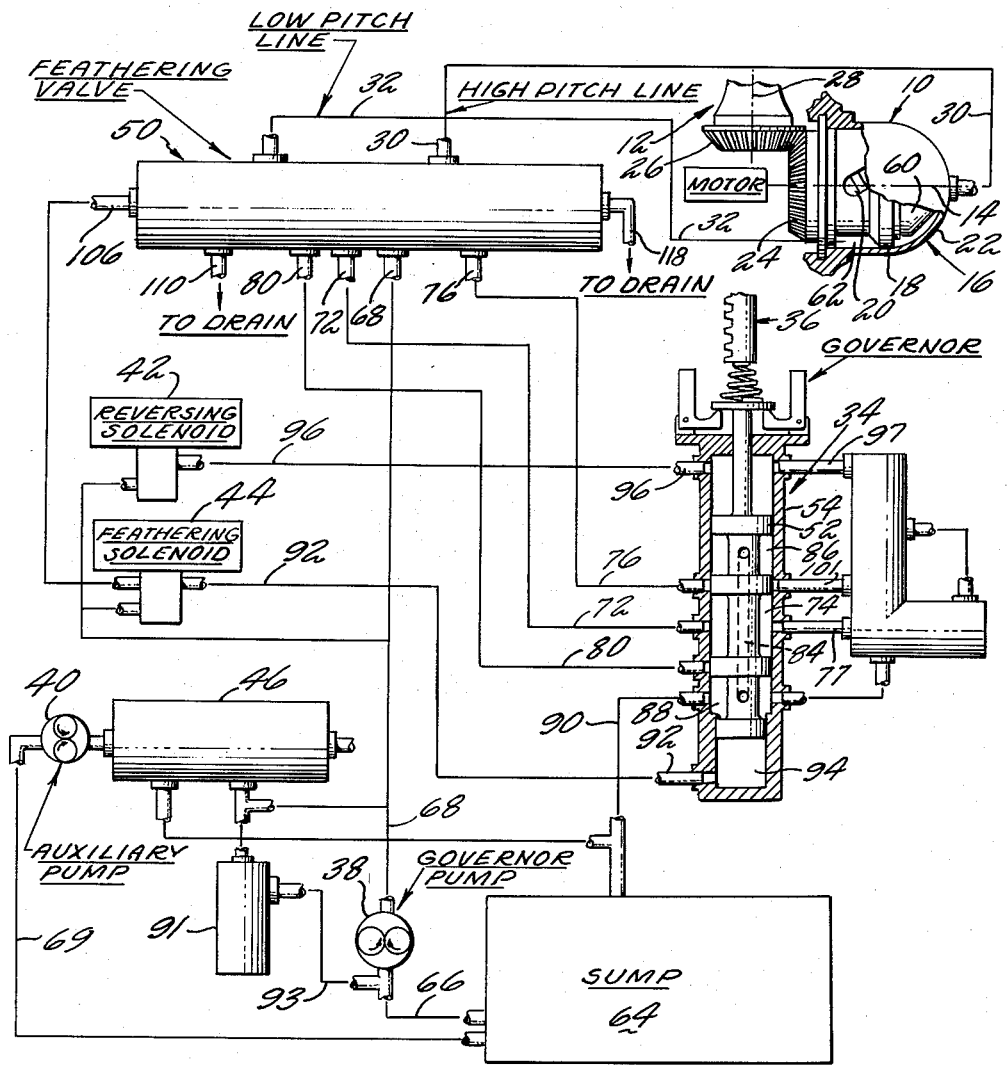

3,004,608
INDEPENDENT FEATHERING SYSTEM
Anthony V. Pond, Manchester, Conn., assignor to United Aircraft Corporation, East Hartford, Conn., a corporation of Delaware
Filed Sept. 16, 1957, Ser. No. 684,314
3 Claims. (Cl. 170—160.16)

This invention relates to control systems and more particularly to a system for controlling the blade pitch of a hydraulically operated propeller of the aircraft type.

It is an object of this invention to provide means for rotating the blade of an aircraft propeller to the position of maximum pitch, known as feather, when the propeller is immobilized due to a malfunction of the governor actuated pilot valve and/or the governor low pressure relief valve which normally performs the function of directing actuating fluid at a sufficient pressure level to the hydraulic motor to change propeller blade pitch. It is desirable to have a malfunctioning propeller in feather for in the feather position the propeller will not rotate or windmill. Airplane drag is thereby minimized.

It is a further object of this invention to provide a feathering valve which will bring the propeller blades to feather when the propeller actuating hydraulic motor pilot valve and/or governor low pressure relief valve are inoperative, which feathering valve cooperates with the pilot valve to direct actuating fluid to the motor during normal operation and which feather valve is held in its normal operating position by a bias spring, and is shiftable by an auxiliary power source to a second position in which said feathering valve blocks the passage of actuating fluid to the pilot valve and low pressure relief valve and directs the fluid directly to the increase pitch side of the pitch change motor.

Other objects and advantages will be apparent from the specification and claims, and from the accompanying drawings which illustrate an embodiment of the invention.

Figure 1:
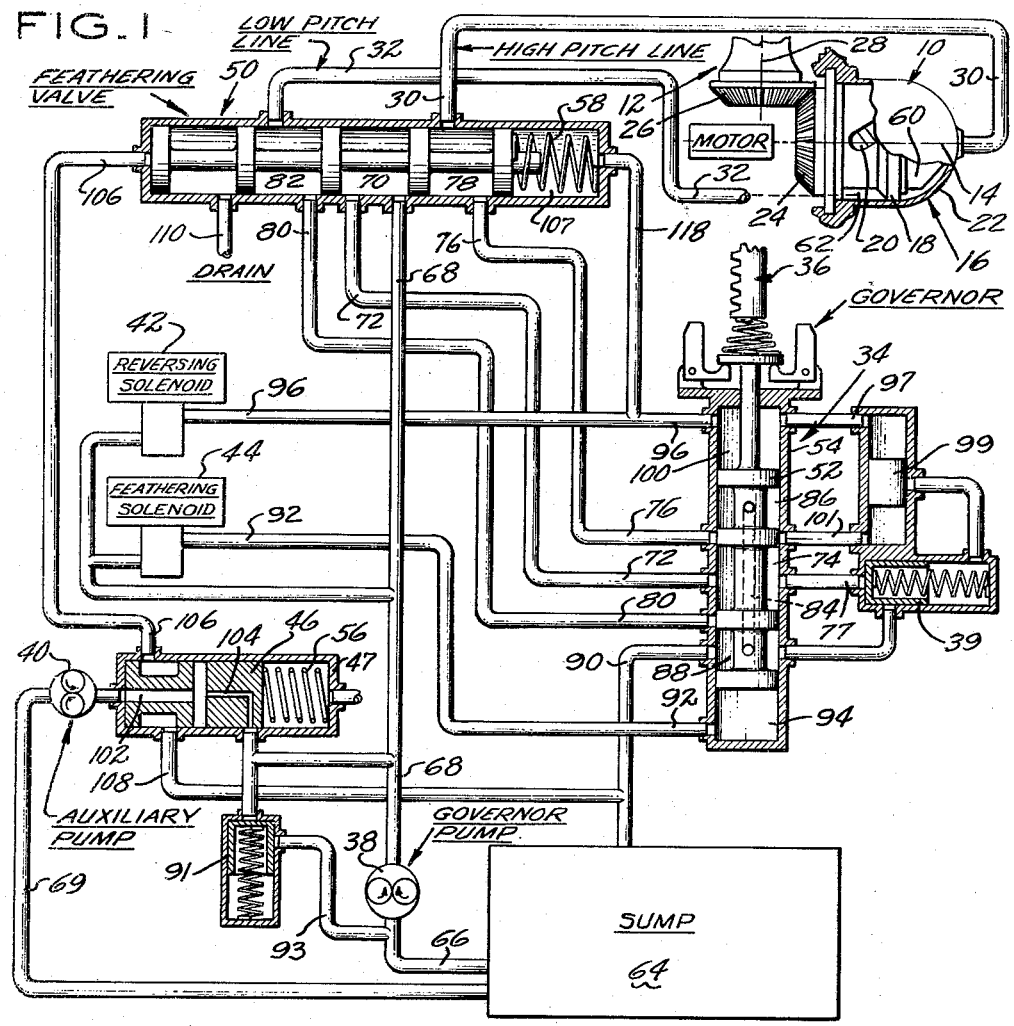
Figure 2:
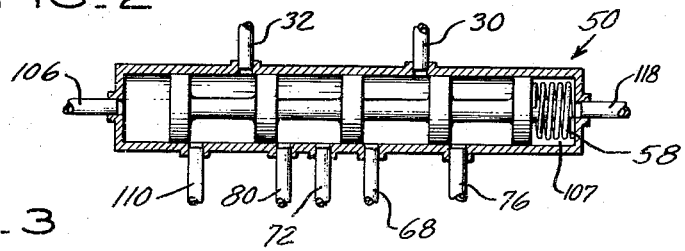
Figure 3:
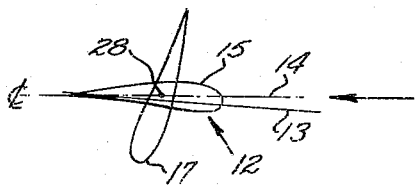

In the drawings:
FIG. 1 is a schematic showing of the propeller pitch control mechanism, including the feathering valve;
FIG. 2 is a schematic showing the feathering valve in its shifted position; and
FIG. 3 is a schematic showing of the propeller blade positions to illustrate feather and reverse pitch.
FIGS. 4 and 5 represent variations to the FIG. 1 embodiment.

Referring to FIG. 1 we see propeller unit 10 which comprises a plurality of radially extending propeller blades 12 projecting from and substantially equally spaced circumferentially about propeller rotating axis 14. Pitch change motor 16 is of the hydraulic type and basically comprises movable piston 18 which carries cam slot 20 and which is movable along axis 14 within cylinder 22 to cause beveled gear 24 to rotate, thereby rotating blade beveled gear 26 to cause propeller blades 12 to rotate about their axes 28, and thereby change blade pitch.

When hydraulic fluid is passed through high pitch line 30, it causes piston 18 to move to the left within cylinder 22, thereby rotating blades 12 to a maximum pitch or feather position in which the chord dimension 13 of the blade airfoil section 15 is substantially aligned with propeller axis 14 (see FIG. 3). When hydraulic fluid is passed through low pitch line 32, piston 18 moves toward the right to cause blades 12 to move toward a lower pitch wherein the chord dimension of their airfoil section will approach and pass through a plane perpendicular to propeller axis 14 to a reverse pitch position 17 (FIG. 3).

For a more particular description of the propeller unit 10 and its hydraulic motor 16, reference is hereby made to United States Patent Numbers 2,791,283 and 2,796,137.

The control system for providing hydraulic fluid to propeller pitch change motor 16 comprises basically pilot valve 34, propeller governor 36, governor pump 38, governor low pressure relief valve 39, auxiliary pump 40, reverse or decrease pitch solenoid actuated valve 42, feather pitch solenoid actuated valve or means 44, shiftable member 46, and feathering valve 50.

Governor 36 is of the constant speed type and performs the function of positioning spool or piston 52 of pilot valve 34 within cylinder 54. Low pressure relief valve 39 is closed in the position shown during any pitch change movement and is open, bypassing governor pump oil when no pitch change is required. Shiftable member 46 is normally in the position shown in FIG. 1 since it is so biased by spring 56. Feathering valve 50 is normally in the position shown in FIG. 1 since it is so biased by spring 58.

Pilot valve 34 determines whether propeller blades 12 are to be moved toward the feather or reverse pitch position by directing fluid either to the increase pitch side 60 of pitch change motor 16 or to the decrease pitch side 62 of pitch change motor 16. By way of operation, hydraulic fluid, from any source such as sump 64 is drawn through line 66 gy governor pump 38 and directed through line 68, cavity 70 of feathering valve 50, and line 72 to cavity 74 of pilot valve 34. Depending upon the position of pilot valve 34, the hydraulic fluid leaves cavity 74 either through line 76, from whence it passes through cavity 78 of feathering valve 50 to high pitch line 30 to rotate blades 12 to an increased pitch angle or through line 80 and cavity 82 of feathering valve 50 to low pitch line 32 to rotate propeller blades 12 to a decreased pitch angle. If the pilot valve is positioned to require no pitch change the hydraulic fluid passes through line 77 to low pressure relief valve 39 where it is bypassed to the fluid source. During this operation, both reverse pitch solenoid valve 42 and feathering solenoid valve 44 are closed so that the only flow to pilot valve 34 is through joined lines 68 and 72. It will further be noted that due to the presence of passage 84, which opens into cavities 86 and 88, the side of pitch change motor 16 which is not receiving hydraulic fluid through pilot valve 34 and feathering valve 50 is connected to drain, such as sump 64 through line 90.

High pressure relief valve 91 limits the fluid pressure in the system to a predetermined maximum by returning fluid through line 93 to the inlet of governor pump 38 when the predetermined maximum is exceeded.

Should the pilot wish to put propeller 10 into feather, he would normally (that is, without feathering valve 50 in the system) actuate the auxiliary pump 40 and feather solenoid valve 44 which would permit the flow of hydraulic fluid through line 92 into cavity 94 of pilot valve 34, thereby moving pilot valve 34 in a direction to increase the size of cavity 94 against the dictates of governor 36. If the pilot wished to put propeller 10 in reverse pitch, he would normally actuate the auxiliary pump 40 and reverse pitch solenoid 42 to permit hydraulic fluid to pass through line 96 and into chamber 100 of pilot valve 34 thereby increasing the volume of cavity 100 to move pilot valve 34 and direct hydraulic fluid to the low pitch side of pitch change motor 16. Feather solenoid valve 44 and reverse pitch solenoid valve 42 were used in the fashion just described before feathering valve 50 was added to the system. They may still be so used but it is the purpose of feather valve 50 to permit the feathering of propeller unit 10 should pilot valve 34 become lodged or stuck or held in any fashion in malfunction in its on-speed or reverse pitch position, either eliminating cavity 94 to prevent the actuation of valve 34 by hydraulic fluid from line 92 or by becoming so firmly lodged that it cannot be moved by the pressure of the actuating fluid from line 92. Feather valve 50 also permits feathering should the low pressure relief valve 39 be prevented from closing because of a spring failure or the plunger being stuck so that the spring cannot return it to its closed position.

The operation of the feather and reverse pitch solenoid actuated valves, the governor and auxiliary pumps and the pilot valve and their associate ducting systems have been described herein merely to the extent necessary to provide the environment and describe the functioning of my feathering valve 50, but are fully disclosed and described in U.S. Patent No. 2,809,702.

Feathering valve 50 is normally positioned as shown in FIG. 1 and cooperates with pilot valve 34 in directing fluid from governor pump 38 to pitch change motor 16 to change the pitch of propeller blades 12. Accordingly, if feathering valve 50 should stick in its FIG. 1 position, both feather and reverse pitch can be obtained through pilot valve 34.

When the pilot wishes to feather propeller unit 10 with pilot valve 34 malfunctioning, he will actuate auxiliary pump 40 and feather solenoid valve 44. The reverse pitch solenoid valve 42 will remain closed. The pressure of the fluid from auxiliary pump 40 acting on shiftable member 46, which is preferably a translatable, multiland piston within cylinder 47 which communicates with lines 68, 106 and 108, will overcome the force of biasing spring 56 and move shiftable means 46 to the right thereby permitting the hydraulic fluid from auxiliary pump 40 to join governor pump fluid in line 68, and, also, pass through line 106 to the anti-spring side of feathering valve 50 to overcome biasing spring 58 and shift feathering valve 50 to the right, as shown in FIG. 2. With feathering valve 50 so shifted, line 68 is connected through feathering valve 50 to high pitch line 30 so that the hydraulic fluid from auxiliary pump 40 and governor pump 38 pass through line 68 to rotate the blades or propeller unit 10 to their feather position.

As stated previously, with pilot valve 34 operating properly and with feathering valve 50 stuck in its FIG. 1 position, pilot valve 34 and feather solenoid 44 would bring blades to feather, and this is the reason for actuating feather solenoid 44 with auxiliary pump 40. Further, with feathering valve 50 stuck in its FIG. 2 position, blades 12 would be brought to the desired feather position. Due to the end area differential of piston 52, feather solenoid 44 would serve to shift pilot valve 34 to its feather position even if reverse solenoid 42 were operated inadvertently and/or incapable of being de-energized.

It will be noted that with feathering valve 50 as shown in FIG. 1, line 106 performs the function of connecting the anti-spring side of valve 50 to drain through line 108. It will further be noted that with valve 50 shifted to position shown in FIG. 2, the low pitch line 32 is connected through valve 50 to drain through line 110.

When the pilot wishes to go to reverse position against the dictates of governor 36, he now actuates reverse solenoid 42 so as to open line 96 and also actuates auxiliary pump 40. Auxiliary pump 40 draws hydraulic fluid through line 69 and provides hydraulic fluid through line 102 into line 68 where it smoothly joins the fluid supply from governor pump 38 as block 46 shifts to join line 102 to 68 and this joint supply of fluid will pass to pilot valve 34 both through line 72 and also through line 96, with reverse pitch solenoid 42 actuated. Fluid from line 96 will cause valve 34 to move to its low pitch position where it will direct fluid through line 80 and feathering valve 50 to the low pitch side 62 of pitch change motor 16. Line 96 directs fluid to low pressure relief valve 39 through line 97 by depressing shuttle valve 99 which holds valve 39 closed. Further, when piston 52 is in its high pitch position, actuating fluid flows through line 101 to shift shuttle valve 99 and close relief valve 39. It will be noted that line 118 connects line 96 to cavity 107 on the spring side of feathering valve 50 so that hydraulic fluid from line 96 assists biasing spring 58 in maintaining feathering valve 50 in the position shown in FIG. 1, against the force of actuating fluid acting on the anti-spring side of feathering valve 50, from line 106. Line 104 is a controlled bleed line which permits regulated flow of governor pump hydraulic fluid through block member 46, to heat auxiliary pump 40 and line 69 when they are inoperative. The size of line 104 is selected to control the amount of flow therethrough.

It is to be understood that the invention is not limited to the specific embodiment herein illustrated and described but may be used in other ways without departure from its spirit as defined by the following claims.

In this regard, another embodiment of my invention which would not depart from the spirit thereof, as depicted in FIG. 1, would be an embodiment as shown in FIG. 4 in which line 106 is connected to line 92 and the shape of piston 52 and/or cylinder 54 are fabricated so that the effective area of piston 52 communicating with chamber 94 is less than the effective area of piston 52 communicating with chamber 100. With such an embodiment, feather solenoid 44 need not be used.

FIG. 5 depicts another embodiment, in which the feather solenoid 44 of FIG. 1 is used as the actuating means for the feathering valve 50 by attaching to feather solenoid 44, the end of line 106 which connects to shiftable member 46 in FIG. 1. The piston 52 and/or cylinder 54 effective area ratio described in the preceding paragraph would again be utilized and line 118 would be disconnected from line 96 and connected to drain.

I claim:

1. A propeller comprising a plurality of blades each pivotable through an intermediate pitch range and a feather range and a reverse pitch range, propeller pitch control mechanism comprising a pitch changing hydraulic motor having pitch increase and pitch decrease sides, a first source of fluid pressure, a propeller speed control governor, governor controlled valve means movable in one direction or the other for directing fluid from said first source to said propeller pitch decrease side or said propeller pitch increase side of said motor for decreasing or increasing the propeller pitch throughout said intermediate range, a second source of fluid pressure, means responsive to said second source fluid pressure to cause the fluid from said sources to join hydraulically, a feathering valve hydraulically connected to said motor, valve means and sources and spring biased to a first position to connect said valve means to at least one of said sources and shiftable to a second position to connect said pitch increase side of said pitch change motor directly to said sources to bring said blades into the feather range, reverse pitch means directing fluid from both of said sources to said valve means for forcing said valve means in one direction to conduct fluid from said sources through said feathering valve to said pitch decrease side of said pitch change motor to decrease the propeller pitch to the reverse pitch range, feather pitch means directing fluid from said sources to said valve means for forcing said valve means in the opposite direction to conduct fluid from said sources through said feathering valve in its first position to said pitch increase side of said pitch change motor to increase propeller pitch to said feather range so that said propeller blades may be brought into said feathering range by said feathering valve when said valve means is inoperative and by said valve means when said feathering valve is inoperative.

2. Propeller pitch control mechanism comprising a pitch changing hydraulic motor having a pitch increase and pitch decrease side, a first source of fluid pressure, second source of fluid pressure, valve means including a governor controlled pilot valve and a spring biased feathering valve for directing pressure fluid from said first source to the propeller pitch increase side or the propeller pitch decrease side of said motor, duct means directing the fluid from said first source through said feathering valve, then through said pilot valve, then through said feathering valve again to either side of said motor when said feathering valve is in its spring biased position, a normally closed feathering solenoid valve located in said ducting between said sources and said pilot valve and actuatable to direct fluid from said pressure sources to said pilot valve to actuate said pilot valve in one direction to increase propeller pitch to the maximum pitch or feather position, a normally closed reversing solenoid valve located in said ducting between said sources and said pilot valve and said feathering valve and actuatable to direct fluid from both said first and second sources to assist said spring in positioning said feathering valve in said spring biased position and to force said pilot valve in the opposite direction to decrease propeller pitch to the maximum reverse pitch position, and shiftable means positioned between said feathering valve and drain and including conduit means connecting the antispring side of said feathering valve to drain when said feathering valve is in said spring biased position and shiftable in response to said second pressure source to smoothly add fluid from said second pressure source to the fluid from said first pressure source in said duct means and to move said feathering valve to a second position to block the flow of pressure fluid from both of said sources to said pilot valve and direct the flow of pressure fluid from both of said sources directly to said propeller pitch increase side of said motor to bring said propeller to the maximum pitch or feather position, while connecting said propeller pitch decrease side of said motor to drain.

3. A variable pitch propeller, an hydraulic pitch change motor connected to said propeller and actuatable between a propeller feather and a propeller reverse pitch position, a governor pilot valve responsive to propeller speed and actuatable between a feather and a reverse pitch position, a propeller feathering valve actuatable between a normal position and a feathering position, a hydraulic fluid pressure source, first conduit means connecting said pressure source to said feathering valve, thence to said governor pilot valve when said feathering valve is in said normal position, thence to said pitch change motor so that said governor pilot valve is actuatable to provide hydraulic fluid from said source to said pitch change motor to actuate said pitch change motor between said propeller feather and said propeller reverse pitch position, second conduit means connecting said pressure source to said feathering valve and thence directly to said pitch change motor when said feathering valve is in said feathering position, propeller reversing mechanism, and third conduit means connecting said pressure source to said governor pilot valve through said reversing mechanism to force said governor pilot valve to said reverse pitch position while also connecting said pressure source to said feathering valve to immobilize said feathering valve in said normal position.

References Cited in the file of this patent

UNITED STATES PATENTS

| | | |
|---|---|---|
| 2,353,566 | Keller | July 11, 1944 |
| 2,507,671 | May | May 16, 1950 |
| 2,653,668 | Anderson | Sept. 29, 1953 |
| 2,761,518 | Treseder | Sept. 4, 1956 |
| 2,840,170 | Best | June 24, 1958 |
| 2,865,460 | St. John | Dec. 23, 1958 |
| 2,910,126 | Jedriziewski | Oct. 27, 1959 |